United States Patent [19]
Brotz

[11] Patent Number: 5,455,706
[45] Date of Patent: Oct. 3, 1995

[54] MIRROR-MOVING SYSTEM

[76] Inventor: Gregory R. Brotz, P.O. Box 1322, Sheboygan, Wis. 53081

[21] Appl. No.: 767,503

[22] Filed: Sep. 30, 1991

Related U.S. Application Data

[63] Continuation-in-part of Ser. No. 454,389, Dec. 21, 1989, Pat. No. 5,072,215, which is a continuation-in-part of Ser. No. 182,920, Apr. 18, 1988, Pat. No. 4,896,150.

[51] Int. Cl.$^6$ ................................................. G02B 26/08
[52] U.S. Cl. ...................... 359/198; 359/199; 359/200; 359/216; 359/225; 359/850; 359/872; 310/90.5
[58] Field of Search ..................... 359/838, 871, 359/872, 198, 199, 223, 224, 225, 226, 216, 217, 218, 219, 213, 850, 200, 220; 505/876, 100, 110, 150; 310/90.5

[56] References Cited

U.S. PATENT DOCUMENTS

| | | | |
|---|---|---|---|
| 4,270,048 | 5/1981 | Liebing | 359/213 |
| 4,886,778 | 12/1989 | Moon et al. | 505/1 |
| 4,995,025 | 2/1991 | Schulze | 359/8 |
| 5,061,679 | 10/1991 | Weeks, II | 505/1 |
| 5,117,139 | 5/1992 | Flom et al. | 310/90.5 |
| 5,126,317 | 6/1992 | Agarwala | 310/52 |

FOREIGN PATENT DOCUMENTS

| | | | |
|---|---|---|---|
| 0157716 | 6/1990 | Japan | 359/872 |
| 1374169 | 2/1988 | U.S.S.R. | 359/872 |

Primary Examiner—Paul M. Dzierzynski
Assistant Examiner—John Juba, Jr.
Attorney, Agent, or Firm—William Nitkin

[57] ABSTRACT

A mirror-moving system having a mirror mounted on a support member able to be repulsed by a superconductor, the mirror being suspended above a superconductive material and a ferromagnetic material around the outer periphery of the support member with a plurality of field coils positioned around the periphery of the ferromagnetic material, each of the field coils being independently operable to attract the ferromagnetic material to cause quick, frictionless movement of the mirror, depending upon which of the field coils is activated, by attraction of the ferromagnetic material to the activated field coil.

3 Claims, 5 Drawing Sheets

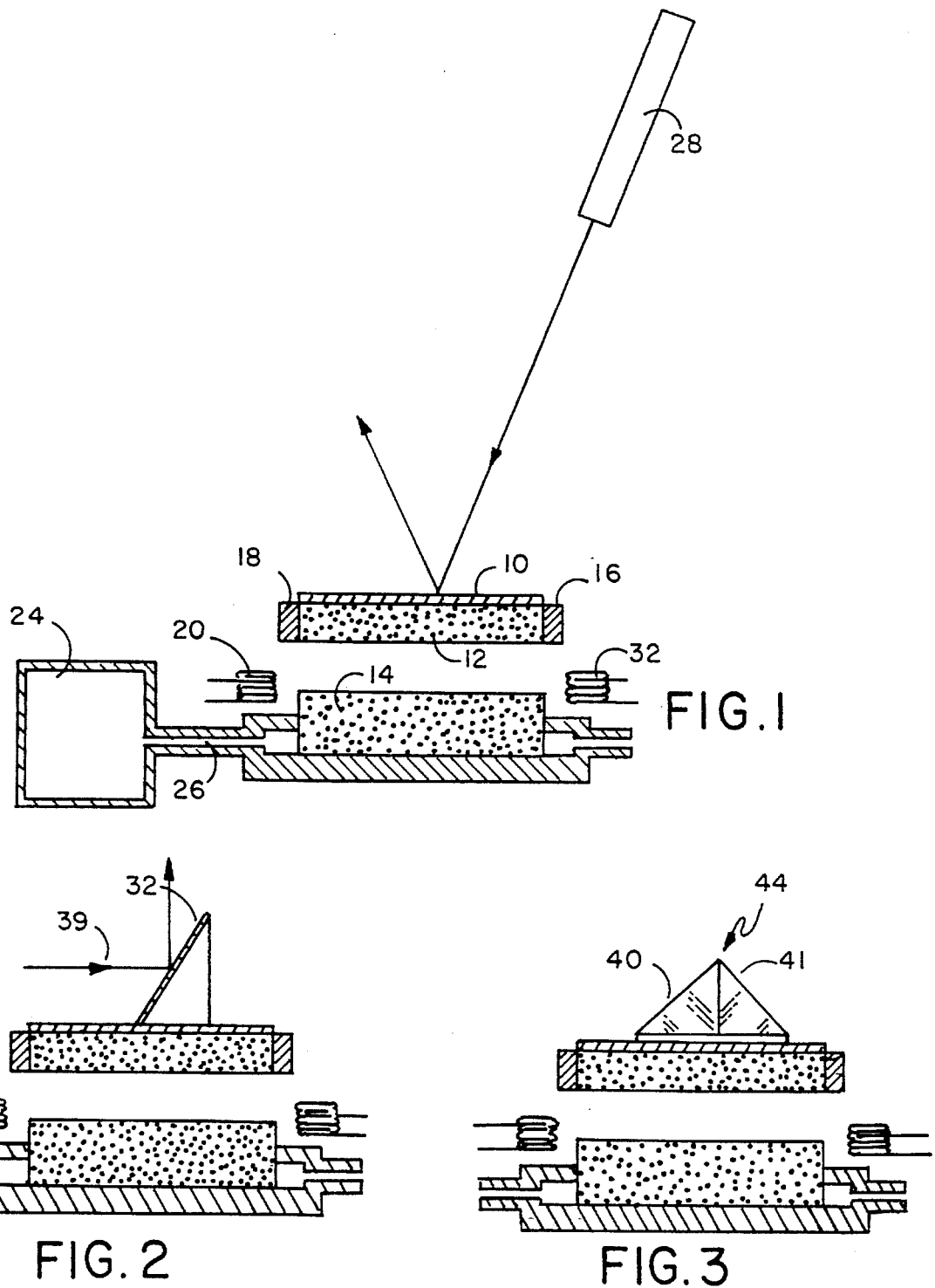

MIRROR-MOVING SYSTEM

This application is a continuation-in-part of my previous application for Three-Dimensional Imaging System, Ser. No. 454,389 filed Dec. 21, 1989, now U.S. Pat. No. 5,072,215 which was a continuation-in-part of my previous application for Three-Dimensional Imaging System, Ser. No. 182,920 filed Apr. 18, 1988, now U.S. Pat. No. 4,896,150.

BACKGROUND OF THE INVENTION

1. Field of the Invention

The system of this invention resides in the field of devices to move mirrors and more particularly relates to a mirror levitated above a superconductive material with the directional movement of such mirror controlled by electronic means.

2. Description of the Prior Art

Mirrors are utilized in the prior art to direct light, including laser beams and the like, to various points. Applicant's U.S. Pat. No. 4,896,150 discloses moving scanning mirrors which reflect laser beams to a plurality of points within a viewing chamber to illuminate particles in specific areas. The mechanical movement of mirrors in the required direction has been traditionally accomplished by using motors such as stepper motors, solenoids and the like. Problems with the prior art relate to the slowness of such electromechanical movement devices which cannot quickly change the mirror's direction of movement. When producing three-dimensional images as described in the aforementioned patent, for example, the mirror-scanning movement must be accomplished at extremely high speed.

SUMMARY OF THE INVENTION

It is an object of this invention to provide a mirror-moving system which changes a mirror's direction extremely quickly without the need for electromechanical movement devices. It is a further goal of this invention to provide a mirror-moving system which creates no friction between the parts involved in such mirror's movement. When reflecting a beam of light such as from a laser, the mirror used in this invention is mounted on, or incorporates, a magnetic material that is levitated above a superconductive material which levitation is due to the Meissner effect. When the magnetic field surrounding a magnet intersects a pure superconductor that is cooled to below its critical temperature, the magnetic field induces eddy currents in the skin of the superconductor. The magnetic fields associated with the eddy currents oppose the applied magnetic field in accordance with Faraday's law of induction and Lenz's law. Consequently, the magnet and the superconductor repel each other. The magnetic flux from the magnet cannot penetrate more than a small distance into the superconductor because of the eddy currents. The mirror or mirror mount includes a peripheral element(s) which can be attracted by field coils thereunder which coils are sequentially activated and wherein the operation and sequencing of such field coil activation is electronically controlled, and is thus virtually instantaneous, to provide for controlled, frictionless, and extremely fast mirror movement.

BRIEF DESCRIPTION OF THE DRAWINGS

FIG. 1 illustrates a cross-sectional view through a mirror levitated above a superconductive material with coils under the mirror periphery.

FIG. 2 illustrates a mirror mounted at an angle on its support means levirated above a superconductive material.

FIG. 3 illustrates a mirror having multiple faces levitated above a superconductive material.

DESCRIPTION OF THE PREFERRED EMBODIMENT(S)

Figure 4:
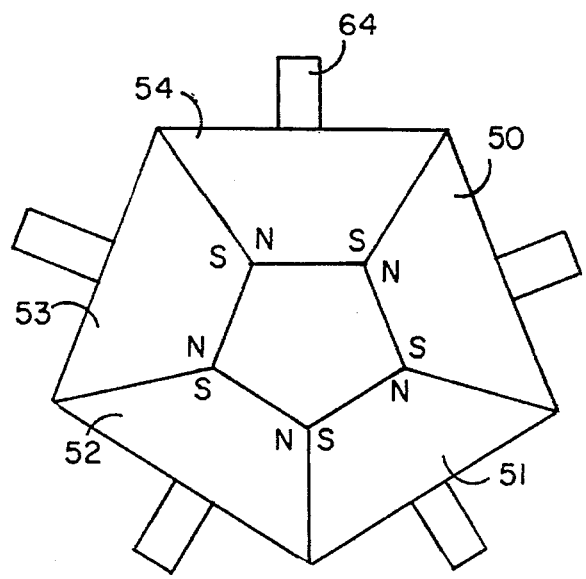
FIG. 4 illustrates a top view of a plurality of interattracted magnets in an array.

Mirror 10 which can move on a plurality of axes is seen in cross-section in FIG. 1 is positioned on magnetic support material 12 which is repulsed and levirated above, superconductive material 14, the temperature of which has been sufficiently lowered to make superconductive material 14 a superconductor. The stronger the magnet in the magnetic support material, the heavier the load it will carry when levitated. Suitable magnetic materials can include Alnico V, a high magnetic strength alloy of aluminum, nickel, cobalt, copper, and iron with an approximate composition of 8% Al, 14% Ni, 24% Co, 3% Cu, 51% Fe; or a platinum-cobalt alloy with high magnetic strength with an approximate composition of 77% Pt and 23% Co; or Cunico, a magnetic alloy of copper, nickel and cobalt in an approximate composition of 50% Cu, 21% Ni and 29% Co or equivalent magnetic materials. Suitable superconductive materials can include a ceramic that is an oxide of yttrium, barium and copper according to the approximate formula:

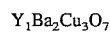

$Y_1Ba_2Cu_3O_7$ or a ceramic that is an oxide of thallium, barium, calcium, and copper according to the approximate formula

$Tl_2Ba_2Ca_2Cu_3O_{10}$ or Lanthanum barium copper oxide $LaBaCuO_4$ or equivalent superconductive materials.

Ferromagnetic material 16 can, in one embodiment, be in the form of a ring positioned around magnetic support material 12. The ferromagnetic material can also, in an alternate embodiment, be formed in segments around magnetic support material 12 or can be formed of extensions of the magnetic support material extending beyond the edges of the superconductive material.

A plurality of secondary field coils such as coils 20 and 22 can be positioned around and below the periphery of mirror 10 and ferromagnetic material 16 to induce controlled motion to levitated mirror 10 when current is provided as, for example, through coils 20 and 22 which can be independently activated and which would attract the nearby section of ferromagnetic material 16, pulling that side of mirror 10 toward the active coil. By controlling which coil is activated and regulating the intensity of the magnetic field of the coil, one can control the direction and amount of movement toward such coil by the mirror. In suspending the mirror by levitation above a superconductive material, there is absolutely no friction relating to the movement of mirror 10 since the entire angular movement of the mirror is controlled by electronically controlled field coils which can direct the movement of the mirror to various positions depending on which secondary field coil(s) is activated. A series of such independently activated field coils can be disposed under the ferromagnetic ring or equivalent structure embodiment as discussed above to obtain control of the mirror's movement in all directions. Laser 28 is shown reflecting its beam off mirror 10 and the direction of the reflected beam is controlled by the mirror movement.

In FIG. 2 beams 30, such as from a laser, which beam can also be any specularly reflected beam in the electromagnetic spectrum, such as infrared, visible and ultraviolet beams, are shown emitted at an angle to the plane of mirror 32 which can be mounted, for example, at an angle to magnetic support material 12.

The mirror used can be made of a polished reflective material, for example, silver, gold, chrome, aluminum, aluminum oxide or equivalent. The mirror can also be made having reflective coatings of these materials on glass, plastic, crystal or equivalent materials. Also dielectric reflective coatings on the aforesaid substrates can function as mirrors. Certain reflective materials or coatings are better reflectors for certain light frequencies than for others.

FIG. 3 illustrates mirrors 40 and 41 being positioned on the visible faces of pentagon 44 with other mirrors on two non-illustrated faces from which beams can be reflected from the various sides with pentagon 44 moving quickly to direct those beams to various positions as would be needed. Other differently shaped mirrors and mirror supports can be used. Superconductive material 14 can have liquid nitrogen flowing therethrough emanating from source 24 through channels 26 so as to make it superconductive. Because of advances in the field of superconductive materials which advances allow for a raise in the temperature required to cause a superconductive reaction in materials, it is envisioned that the mirror of this invention will be supported above a superconductive material at some point in the future where the superconductive material will not require such extensive cooling in order to make it superconductive.

The secondary field coils, such as field coils 20 and 22, can each be independently controlled through a series of electronic circuits, which are not illustrated, but the sequence and operation of these circuits would depend on the needs of the device in which the moving mirror is positioned. More field coils and/or a plurality of ferromagnetic segments or magnetic support material extensions or equivalent structure can be provided around the mirror for further directional control of the mirror's movement. A controlled stream of air directed at the levirated magnetic material can also help position the mirror. The electronic circuitry provides the voltage for secondary field coils 20 and 22 to direct the mirror to the desired position so that the beam, such as from laser source 28, or other beam source hits the object desired to be struck by the reflected beam depending upon which type of system utilizes the movable mirror of this invention. The movement of mirror 10 once in its levitated position above the superconductive material 14 is affected by the specific attraction of a coil, such as coil 22, when biased on, creating a magnetic field pulling that edge of the levitated mirror nearest the coil, opposing the repelling force of the superconductive material. Since the Superconductor can reflect other magnetic fields, the positioning of the coils must be accomplished so as not to have their magnetic fields adversely affected by the superconductor.

Mirror 10 will return to its original levitated position above superconductive material 14 when the activated coil has been biased off. By operating the coils in sequence by electronic controls, the mirror can be moved virtually instantaneously and frictonlessly to a variety of positions to direct any beam reflected by the mirror.

Figure 5:
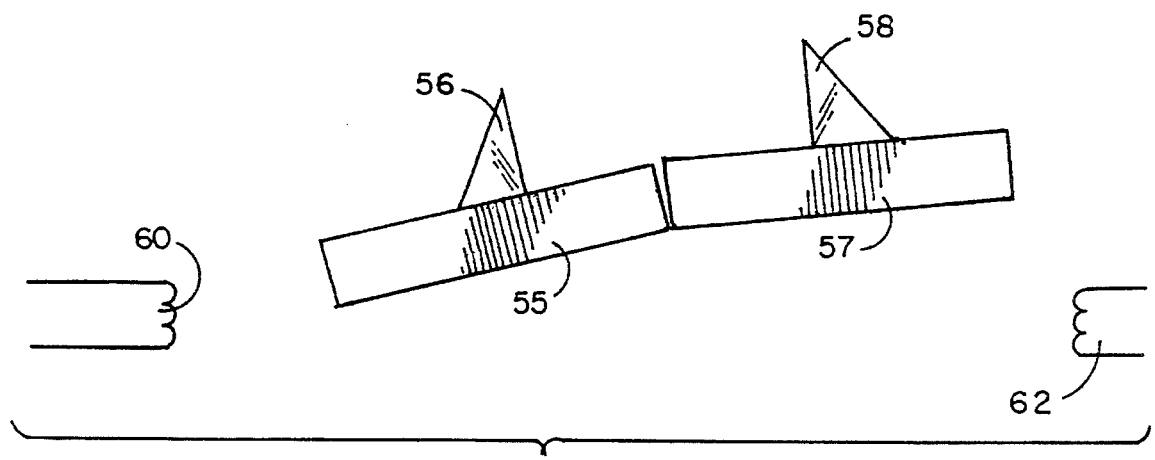
FIG. 5 illustrates a side view of two interattracted magnets showing one magnet deviated from the plane of the other.

Multiple interattracted levitated magnets 50, 51, 52, 53 and 54 seen in FIG. 4 and partially in side view in FIG. 5 are releasably joined together by mutual magnetic attraction, each such magnet with an individual mirror configuration thereon such as configurations 56 and 58 in FIG. 5 and each having its own independent field coil, such as coils 60 and 62, respectively. Multiple interattracted magnet bases can yield a wide variety of configurations for different mirror positioning and movement.

Figure 6:
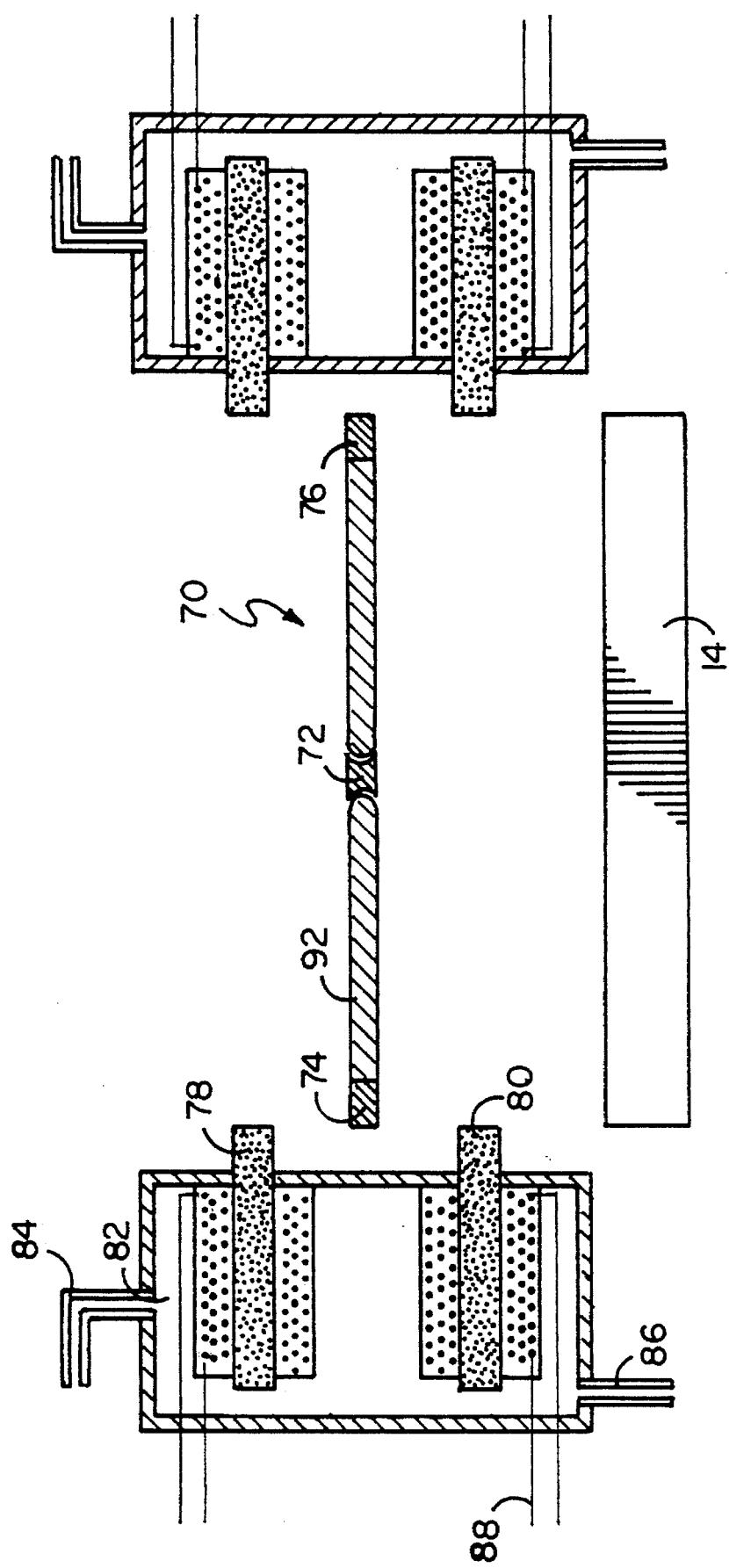
FIG. 6 illustrates a cross-sectional view through an alternative embodiment wherein the mirror element is levirated between coil members.
Figure 7:
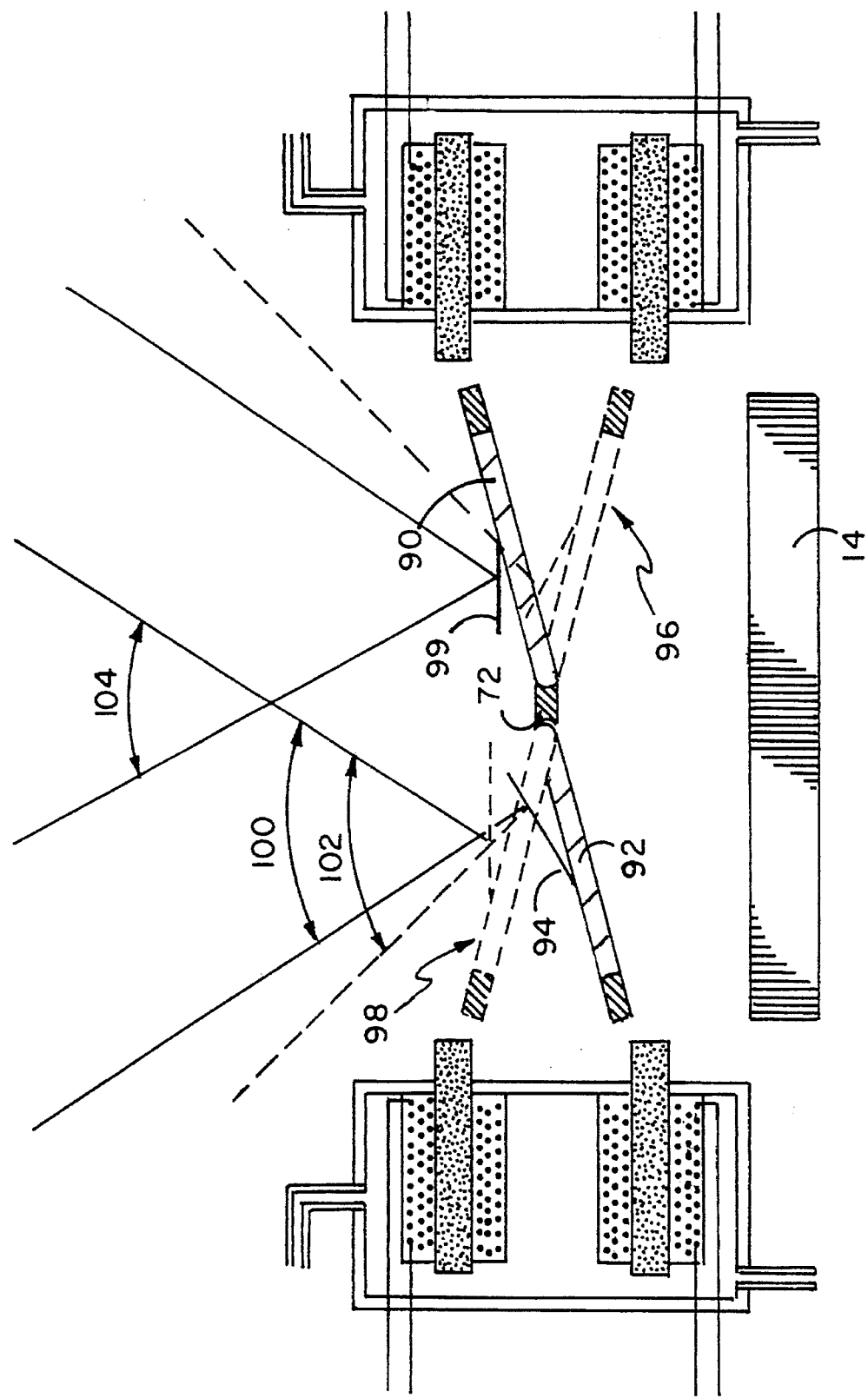
FIG. 7 illustrates the embodiment of FIG. 6 wherein the mirror support materials have mirrors positioned thereon illustrating angles of reflectance.
Figure 8:
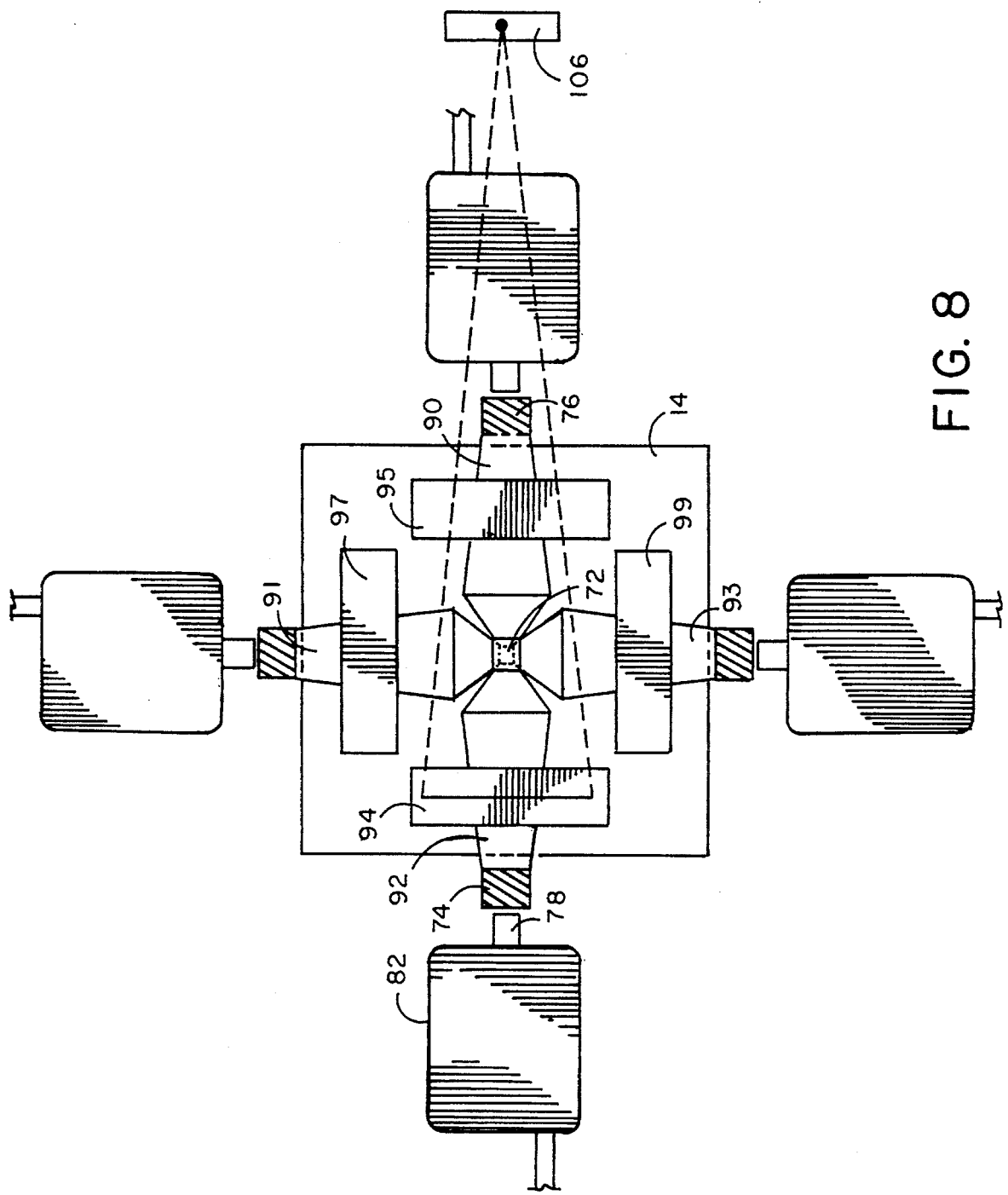
FIG. 8 illustrates a top view of the embodiment of FIG. 6 showing the plurality of mirrors on their magnetic support material structures levitated above a superconductive material.

In another embodiment, as shown in FIG. 6, multiple levitated magnetic support material can be levitated above a superconductor 14. Such multiple levitated magnetic support material 70 can have, as above, at its periphery a ferromagnetic material such as 74 and 76. Hinge 72 is seen allowing flexibile movement of the individual magnetic support material members as seen in FIG. 7. In this view the individual magnetic support material 90 and 92 are seen in a first position above and below the plane of the original levitated mirror support member and then in dotted lines in an alternate position shown by positions 96 and 98 when such mirror supports have been attracted to an alternate position. On the magnetic support material such as 90 and 92 are mounted mirrors 94 and 99. These mirrors, as will be described below, have reflective arc paths which are changed depending on the movement of their associated magnetic support member thereunder. The magnetic support material, for example, as seen in FIG. 6, can be attracted to either a magnet 78 located above the magnetic support material 92 or magnet 80 located below the magnetic support material 92. In this way because of the hinge action of hinge 72, the magnetic support material, for example 92, can be either moved upwards toward magnet 78 or downwards toward magnet 80 depending upon which magnet is activated through its electronic lines such as 88. It should be noted that the magnets 78 and 80 could also be superconducting materials as well wherein coolant could be entered through pipe 84 through chamber 82 containing the body of magnets 78 or 80 and these magnets can be supercooled to create also a superconductivity which will interact with magnetic support material 70 to drive the mirrors thereon in a variety of directions. It is seen in FIG. 7 that when mirror 94 is in its downward position 98, the arc that it scribes is indicated by arc 102. When magnetic support material 92 is in its upward position, as seen by dotted lines 98, the arc that it covers would be designated by arrow 100. It should be noted that magnetic support materials 90 and 92 on either side of hinge 72 can be directed so that their respective arc areas overlap as seen in arc 104 in FIG. 7 so that a wide area can be covered by these mirrors which are disposed on the magnetic support materials. FIG. 8 illustrates a top view of the structure of FIG. 7 wherein electromagnets 82 are seen disposed around four of the magnetic support materials 90, 91, 92 and 93. These are all hinged to hinge 72 and are supported above superconductor 14. Light source 106 is seen projecting a light to mirror 94 which depending upon its direction of movement, which of course will be extremely rapid because of its levitation and attraction to either the upper or lower electromagnets 78 or 80, will direct that beam to the desired position. In the same way the other mirrors 95, 97 and 99 are directed by their respective electromagnet arrays to either an upper, middle or lower position or anywhere inbetween and thus a wide variety of light direction motions can be obtained utilizing this embodiment of the invention.

Although the present invention has been described with reference to particular embodiments, it will be apparent to those skilled in the art that variations and modifications can be substituted therefor without departing from the principles and spirit of the invention.

I claim:

1. A mirror movement system comprising:

a plurality of support members magnetically interattracted to one another, each support member comprising means or being repulsed by a superconductor, each of said support members having an outer periphery, a top and a bottom;

a plurality of mirrors each mounted at an angle on the top of each of said support members;

a segment of ferromagnetic material positioned at the outer periphery of each of said support members;

a superconductive material;

means to levitate said support members to float over said superconductive material;

a plurality of field coils, each positioned around the outer periphery of each of said support members; and means to activate said field coils at a desired intensity to attract said ferromagnetic material segment to change the position of each of said floating mirrors.

2. A mirror movement system comprising:

a support member comprising means for being repulsed by a superconductor, said support member having an outer periphery, a top and a bottom;

a mirror mounted on the top of said support member;

a segment of ferromagnetic material positioned at the outer periphery of said support member;

a superconductive material;

means to levitate said support member to float over said superconductive material;

at least one field coil positioned around the outer periphery of said support member;

means to activate said field coil at a desired intensity to attract said ferromagnetic material segment to change the position of said floating mirror;

a plurality of hinged magnetic support material elements;

a plurality of mirror elements each supported on a selected one of said magnetic support material elements; and means to attract said ferromagnetic material to a desired position.

3. A mirror movement system comprising:

a support member comprising means for being repulsed by a superconductor, said support member having an outer periphery, a top and a bottom;

a mirror mounted on the top of said support member;

a segment of ferromagnetic material positioned at the outer periphery of said support member;

a superconductive material;

means to levitate said support member to float over said superconductive material;

at least one field coil positioned around the outer periphery of said support member;

means to activate said field coil at a desired intensity to attract said ferromagnetic material segment to change the position of said floating mirror; and a pair of field coils positioned above and below said floating support member adapted to attract at designated times said support member toward one or the other of said field coils.

* * * * *